(12) United States Patent
Baldwin

(10) Patent No.: US 9,779,014 B2
(45) Date of Patent: *Oct. 3, 2017

(54) RESILIENT MOCK OBJECT CREATION FOR UNIT TESTING

(71) Applicant: International Business Machines Corporation, Armonk, NY (US)

(72) Inventor: Timothy J. Baldwin, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/816,867

(22) Filed: Aug. 3, 2015

(65) Prior Publication Data

US 2015/0339219 A1    Nov. 26, 2015

Related U.S. Application Data

(63) Continuation of application No. 13/633,291, filed on Oct. 2, 2012, now Pat. No. 9,122,805.

(51) Int. Cl.
*G06F 9/44* (2006.01)
*G06F 11/36* (2006.01)

(52) U.S. Cl.
CPC ................. *G06F 11/3696* (2013.01)

(58) Field of Classification Search
CPC .................................... G06F 11/3696
USPC .................................. 717/123–129
See application file for complete search history.

(56) References Cited

U.S. PATENT DOCUMENTS

| | | | |
|---|---|---|---|
| 7,496,791 B2 | 2/2009 | Tillmann et al. | |
| 7,587,636 B2 * | 9/2009 | Tillmann ............. | G06F 11/00 714/25 |
| 7,797,687 B2 * | 9/2010 | Tillmann ............. | G06F 11/3684 714/38.14 |
| 7,844,951 B2 * | 11/2010 | Chen ..................... | G06F 8/74 717/106 |
| 7,954,091 B2 * | 5/2011 | Li ........................ | G06F 8/24 703/22 |
| 7,971,010 B2 * | 6/2011 | Schmelter ............ | G06F 11/3466 707/816 |
| 7,971,090 B2 * | 6/2011 | Nan ..................... | G06F 11/3696 709/202 |
| 8,046,746 B2 * | 10/2011 | Tillmann ............. | G06F 11/3688 714/33 |

(Continued)

OTHER PUBLICATIONS

Saff et al, "Mock Object Creation for Test Factoring", ACM, pp. 49-51, 2004.*

(Continued)

*Primary Examiner* — Anil Khatri
(74) *Attorney, Agent, or Firm* — Steven M. Greenberg, Esq.; CRGO Law

(57) ABSTRACT

Embodiments of the invention provide for fault alerting in mock object supported unit testing. In a method for fault alerting in mock object supported unit testing an instance a mock object proxying for an object under test by test code is created in memory of a computing system and an invocation of a method in the object under test is proxied by method name to the mock object. Then, it is determined whether or not a method exists in memory for the mock object corresponding to the method name. Finally, an exception handler is invoked for the mock object outputting error text indicating a non-presence of a method associated with the method name responsive to a method by the method name not existing in the memory for the mock object, but otherwise a method is invoked that exists in the memory of the mock object corresponding to the method name.

12 Claims, 1 Drawing Sheet

(56) References Cited

U.S. PATENT DOCUMENTS

| | | | | |
|---|---|---|---|---|
| 8,112,262 | B1* | 2/2012 | Michelsen | G06F 11/3688 703/13 |
| 8,245,194 | B2* | 8/2012 | Atkin | G06F 11/3688 717/106 |
| 8,510,712 | B1* | 8/2013 | Killmar, III | G06F 11/3684 717/124 |
| 8,954,929 | B2* | 2/2015 | Braude | G06F 11/3688 717/124 |
| 9,015,677 | B2* | 4/2015 | Tunik | G06F 9/4443 717/124 |
| 2008/0127093 | A1 | 5/2008 | Fernandez-Ivern et al. | |
| 2010/0077381 | A1 | 3/2010 | Allen et al. | |
| 2011/0239194 | A1 | 9/2011 | Braude | |

OTHER PUBLICATIONS

Freeman et al, "jMock: Supporting Responsibility-Based Design With Mock Objects", ACM, pp. 4-5. 2004.*

Taneja et al, "MODA: Automated Test Generation for Database Applications via Mock Objects", ACM, pp. 289-292, 2010.*

Coelha et al, "Unit Testing in Multi-agent Systems using Mock Agents and Aspects", ACM, pp. 83-89, 2006.*

Solms et al, "Contract-Based Mocking for Services-Oriented Development", ACM, pp. 1-8, 2016.*

Nandigam et al, "Interface-Based Object-Oriented Design with Mock Objects", IEEE, pp. 713-718, 2009.*

Marri et al, "An Empirical Study of Testing File-System-Dependent Software with Mock Objects", IEEE, pp. 149-153, 2009.*

Kim et al, "Mock Object Models for Test Driven Development", IEEE, pp. 1-8, 2006.*

Park, et al., Mock Object Models for Test Driven Development, Software Engineering Research, Management and Applications, Fourth Int. Conf., Aug. 2006.

Saff, et al., "Mock Object Creation for Test Factoring," Paste '04 Proceedings of the 5th ACM SIGPLAN-SIGSOFT workshop, Jun. 2004.

Chaffee, et al., "Unit Testing With Mock Objects," IBM developers Works, Nov. 2002.

Thomas, et al., "Mock Objects," Software, IEEE, May 2002.

* cited by examiner

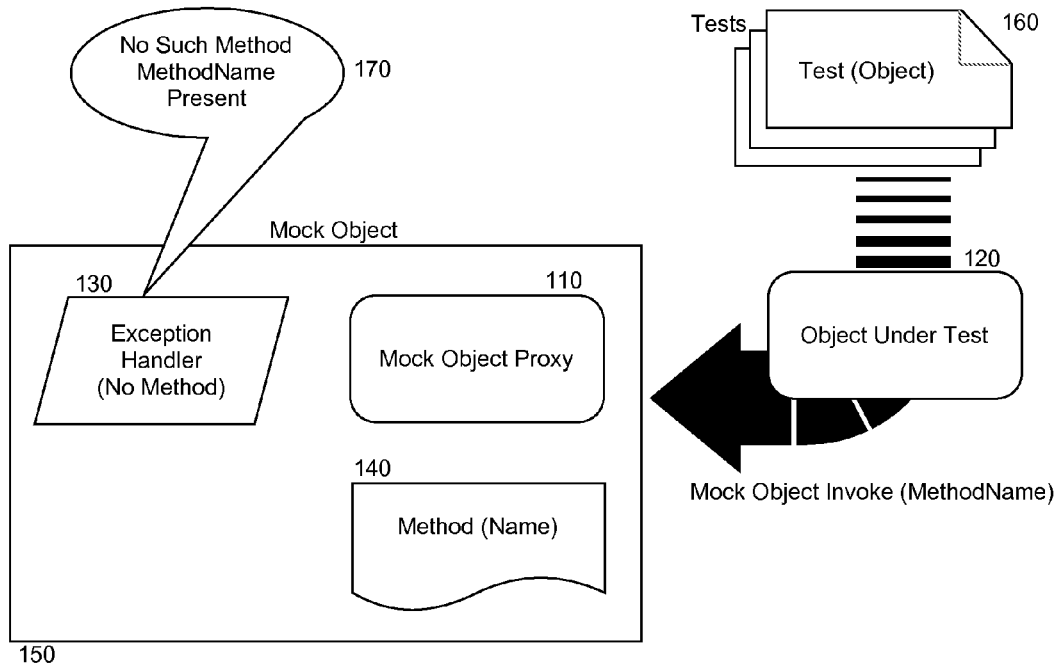
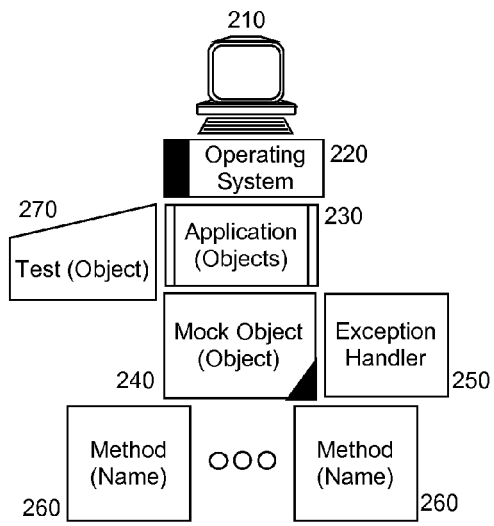
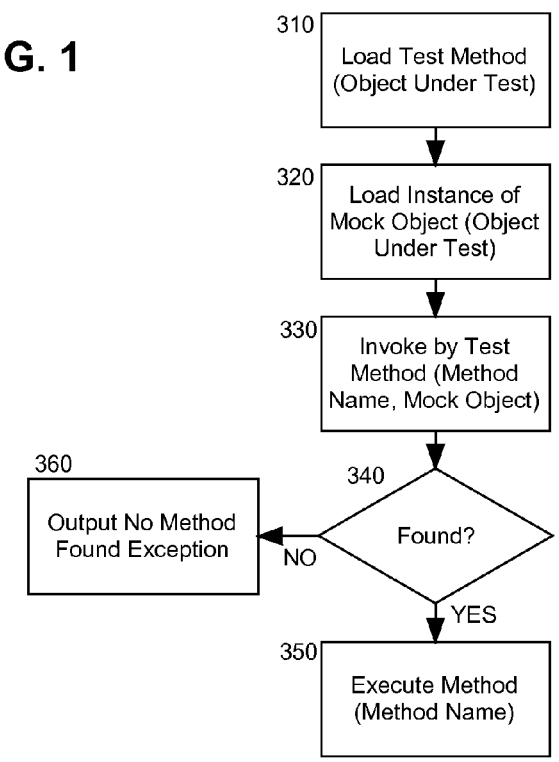
FIG. 1
FIG. 2
FIG. 3

US 9,779,014 B2

RESILIENT MOCK OBJECT CREATION FOR UNIT TESTING

CROSS-REFERENCE TO RELATED APPLICATIONS

This application is a Continuation of U.S. application Ser. No. 13/633,291, filed Oct. 2, 2012, the entirety of which is incorporated herein by reference.

BACKGROUND OF THE INVENTION

Field of the Invention

The present invention relates to software unit testing and more particularly to the use of mock objects during software unit testing.

Description of the Related Art

Unit testing is a software development process in which the smallest testable portions of a software application are individually and independently scrutinized for proper operation. Unit testing can be either automated or performed manually, however, in most cases, unit testing is performed through an automated process of a testing tool. Of note, unit testing is a stage of "Extreme Programming" in which the software development lifecycle requires continual testing and revision.

Unit testing involves only those characteristics that are vital to the performance of the unit under test. As such, unit testing encourages developers to modify source code without the immediate concern of how any imposed changes to the source code might affect the operability of other units of source code or the software application as a whole. Once all of the units in a software application have been found to execute in a most efficient and error-free manner possible, larger components of the software application can be evaluated by means of integration testing.

Of note, unit testing has become widely accepted as a "best practice" for software development. For every object developed by a developer, a corresponding automated test class must be developed to include methods that test the object, calling its various public methods with various parameters and ensuring that the values returned are appropriate. It will be recognized then that in respect to simple data or service objects, writing unit tests can be straightforward. However, many objects rely on other objects or layers of infrastructure. Consequently, when it comes to testing these types of objects, unit testing can become expensive, impractical, or inefficient.

For example, to unit test an object that uses a database, it may be burdensome to install, configure, and seed a local copy of the database, run the unit tests, and then remove the database. Mock objects provide a solution to this dilemma. A mock object conforms to the interface of the real object under test, but contains only enough program code to fool the tested object and track its behavior. For example, a database connection for a particular unit test might record the query while always returning the same hardwired result. As long as the class being tested behaves as expected, the object under test will not notice the difference, and the unit test can check that the proper query was emitted.

The use of mock objects, however, is not without its complications. In this regard, when an interface to which a mock object conforms changes, the mock object implementation will fail to compile unless the mock object also changes. The necessity to change the mock object, however, is often not obvious to the developer who changes the interface, since the changing developer is not likely to know all components that have included mock versions with corresponding test suites. Consequently, broken builds, test failures and time wasting can be the undesirable result.

BRIEF SUMMARY OF THE INVENTION

Embodiments of the present invention address deficiencies of the art in respect to the use of mock objects in unit testing and provide a novel and non-obvious method, system and computer program product for fault alerting in mock object supported unit testing. In an embodiment of the invention, a method for fault alerting in mock object supported unit testing is provided. The method includes creating in memory of a computing system an instance a mock object proxying for an object under test by test code and proxying by method name an invocation of a method in the object under test to the mock object. The method also includes determining whether or not a method exists in memory for the mock object corresponding to the method name. Finally, the method includes invoking an exception handler for the mock object outputting error text indicating a non-presence of a method associated with the method name responsive to a method by the method name not existing in the memory for the mock object, but otherwise invoking a method that exists in the memory of the mock object corresponding to the method name.

In another embodiment of the invention, a unit test data processing system is configured for fault alerting in mock object supported unit testing. The system includes a host computing system with at least one computer with at least one processor and memory. The system also includes different objects of an application executing in the memory of the host computing system. Finally, the system includes at least one mock object proxying in the memory of the host computing system method calls to a corresponding one of the objects of the application. In this regard, the mock object includes program code enabled to proxy by method name an invocation of a method in the object under test, to determine whether or not a method exists in memory for the mock object corresponding to the method name, and to invoke an exception handler for the mock object outputting error text indicating a non-presence of a method associated with the method name responsive to a method by the method name not existing in the memory for the mock object, but otherwise to invoke a method that exists in the memory of the mock object corresponding to the method name.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for fault alerting in mock object supported unit testing;

FIG. 2 is a schematic illustration of a unit test data processing system configured for fault alerting in mock object supported unit testing; and, FIG. 3 is a flow chart illustrating a process for fault alerting in mock object supported unit testing.

DETAILED DESCRIPTION OF THE INVENTION

Embodiments of the invention provide for fault alerting in mock object supported unit testing. In accordance with an embodiment of the invention, a mock object can be configured to throw an exception by default when an invoked method in the mock object is not defined for the mock object. For instance, the mock object can be created as a proxy and associated with a corresponding invocation handler providing an invoke method. The invoke method in turn can specify an exception handler that throws an exception when an invoked method is not present in the mock object by name and signature. Otherwise, the invoked method if present in the mock object by name and signature can be returned. In this way, a warning can be issued whenever a method in an interface to which the mock object conforms has changed without a corresponding method addition provided for in the mock object.

In further illustration, FIG. 1 pictorially shows a process for fault alerting in mock object supported unit testing. As shown in FIG. 1, a mock object 150 can be defined for an object under test 120. The mock object 150 can be defined as a proxy and can include an invoke method 110 enabled to invoke defined methods 140 in the mock object 150 by name and signature. The mock object 150 further can be defined to include an exception handler 130 executed when the invoke method 110 is called for a method name and signature that does not correspond to a method 140 defined for the mock object 150. The exception handler 130 in turn can be configured to output a message 170 indicating the non-presence of the invoked method for the method name and method signature.

In operation, one or more tests 160 can be applied against an object under test 120. The mock object 150 can be defined to an interface for the object under test 120 and can include different methods 140 requisite to the testing of the object under test 120 by the test code of the test 160. To the extent that a method of the object under test 120 is called by name and signature in the mock object 150 in order to test the method, if the method by that name and signature is not present in the mock object 150, the exception handler 130 will trigger resulting in the outputting of the error message. Otherwise, one of the methods 140 of the mock object corresponding to the name and signature will be invoked.

The process described in connection with FIG. 1 can be implemented within a unit test data processing system. In yet further illustration, FIG. 2 is a schematic illustration of a unit test data processing system configured for fault alerting in mock object supported unit testing. The system can include a host computing system 210 that includes one or more computers each with memory and at least one processor. An operating system 220 can execute within the host computing system 210 and can support the operation of an application 230 of different programmatic objects. A mock object 240 further can be provided in the memory of the host computing system 210 and can include one or more different methods 260, callable by name and signature, that are requisite to testing by test code 270 a corresponding one of the objects in the application 230. The mock object 240 additionally can include an exception handler 250 invoked when a method corresponding to a name and signature is called, but not present in the mock object 240.

In one aspect of the embodiment, the mock object 240 can implement an invocation handler as a proxy object to one of the objects in the application 230. Exemplary code can include:

```
imports.com.example.a.InterfaceToBeProxied;
imports java.lang.reflect.*;
public class MockInterfaceToBeProxiedImpl implements
InvocationHandler
{
  static InterfaceToBeProxied newInterfaceToBeProxied( )
  {
      private MockInterfaceToBeProxiedImpl mockImpl = new
MockInterfaceToBeProxiedImpl( );
      return (InterfaceToBeProxied)Proxy.newProxyInstance(
          mockImpl.getClass( ).getClassLoader( ),
          new Class[ ] { InterfaceToBeProxied.class },
mockImpl);
  }
  private MockInterfaceToBeProxiedImpl( ) { }
  public Object invoke(Object proxy, Method method, Object[ ]
args) throws Throwable
  {
     try {
       Method mockMethod =
getClass( ).getMethod(method.getName( ),
method.getParameterTypes( ));
         return mockMethod.invoke(this, args);
     } catch (NoSuchMethodException e) {
         throw new UnsupportedOperationException("Mock object does
not implement: " + method);
     } catch (InvocationTargetException e) {
         throw e.getTargetException( );
     }
  }
  public int methodX(...) { return 0 }
  public int methodY(...) { return 1 }
  public int methodZ(...) { return 2 }
}
```

In the exemplary code, a static factory method is provided with a private constructor within the mock object 240 in order to return a mock interface to the one of the objects in the application 230 to be proxied during testing. Even yet further, an invoke( ) method is defined within the mock object 240 to receive a method name and signature corresponding to one of the different methods 260 of the proxied interface (shown here as methodX( ), methodY( ) and methodZ( )) within the mock object 240 that is associated with the method name and signature. Finally, the exception handler in the mock object 240 executes when the invoke( ) method is called for a method name and signature that does not correspond to one of the different methods 260 defined for the mock object 240.

In yet further illustration, FIG. 3 is a flow chart illustrating a process for fault alerting in mock object supported unit testing. Beginning in block 310, a test method can be loaded in order to test an object under test of an application. In block 320, an instance of a mock object proxying for the object under test can be loaded into memory and in block 330, a test method in the object under test can be invoked by name and signature which can be passed to an invocation method of the mock object. In decision block 340, it can be determined if the name and signature correspond to a method present in the mock object. If so, in block 350 the invoked method can be executed during the test. Otherwise, in block 360 an exception can be invoked indicating that the method by name and signature cannot be found in the mock object.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for fault alerting in mock object supported unit testing, the method comprising:
    creating in memory of a computing system an instance of a mock object;
    proxying for an object under test by test code;
    proxying by method name an invocation of a method in the object under test to the mock object;
    determining absence in memory of a method corresponding to the method name for the mock object; and,
    responsive to the determination of the absence of the method name, invoking an exception handler for the mock object; and
    responsive to the invocation of the exception handler for the mock object, outputting error text indicating the absence of the method name;
    determining whether or not the method exists in memory for the mock object corresponding to the method name and a method signature.

2. The method of claim 1, wherein the mock object has a constructor that is private in nature.

3. The method of claim 1, wherein the mock object provides for a static factory method creating instances of the mock object.

4. The method of claim 1, wherein the determination of whether or not the method exists in memory for the mock object corresponding to the method name.

5. A unit test data processing system configured for fault alerting in mock object supported unit testing, the system comprising:
    a host computing system with at least one computer with at least one processor and memory;
    a plurality of objects of an application executing in the memory of the host computing system; and,
    at least one mock object proxying in the memory of the host computing system method calls to a corresponding one of the objects of the application,
    the mock object comprising program code enabled to proxy by method name an invocation of a method in the object under test, to determine whether or not a method exists in memory for the mock object corresponding to the method name, and
    to invoke an exception handler for the mock object outputting error text indicating a non-presence of a method associated with the method name responsive to a method by the method name not existing in the memory for the mock object, but otherwise to invoke a method that exists in the memory of the mock object corresponding to the method name;
    determining whether or not the method exists in memory for the mock object corresponding to the method name and a method signature.

6. The system of claim 5, wherein the mock object has a constructor that is private in nature.

7. The system of claim 5, wherein the mock object provides for a static factory method creating instances of the mock object.

8. The system of claim 5, wherein the determination of whether or not the method exists in memory for the mock object corresponding to the method name.

9. A computer program product for fault alerting in mock object supported unit testing, the computer program product comprising:
    a computer readable storage medium having computer readable program code embodied therewith, wherein the computer readable storage medium is not a transitory signal per se, the computer readable program code comprising:
    computer readable program code for creating an instance a mock object proxying for an object under test by test code;
    determining whether or not the method exists in memory for the mock object corresponding to the method name and a method signature.

10. The computer program product of claim 9, wherein the mock object has a constructor that is private in nature.

11. The computer program product of claim 9, wherein the mock object provides for a static factory method creating instances of the mock object.

12. The computer program product of claim 9, wherein the determination of whether or not the method exists in memory for the mock object corresponding to the method name.

* * * * *